INVENTOR.
RICHARD W. SPENCER
BY
Charles G. English
AGENT

June 12, 1962 R. W. SPENCER 3,039,082

SHIFTING REGISTER

Filed Nov. 23, 1955 3 Sheets-Sheet 2

INVENTOR
RICHARD W. SPENCER

BY Charles E. English
AGENT

June 12, 1962 R. W. SPENCER 3,039,082

SHIFTING REGISTER

Filed Nov. 23, 1955 3 Sheets-Sheet 3

INVENTOR.
RICHARD W. SPENCER
BY
Charles C. English
AGENT

United States Patent Office 3,039,082

Patented June 12, 1962

3,039,082

SHIFTING REGISTER

Richard W. Spencer, Philadelphia, Pa., assignor to Sperry Rand Corporation, New York, N.Y., a corporation of Delaware Filed Nov. 23, 1955, Ser. No. 548,575
15 Claims. (Cl. 340—174)

Figure 1:
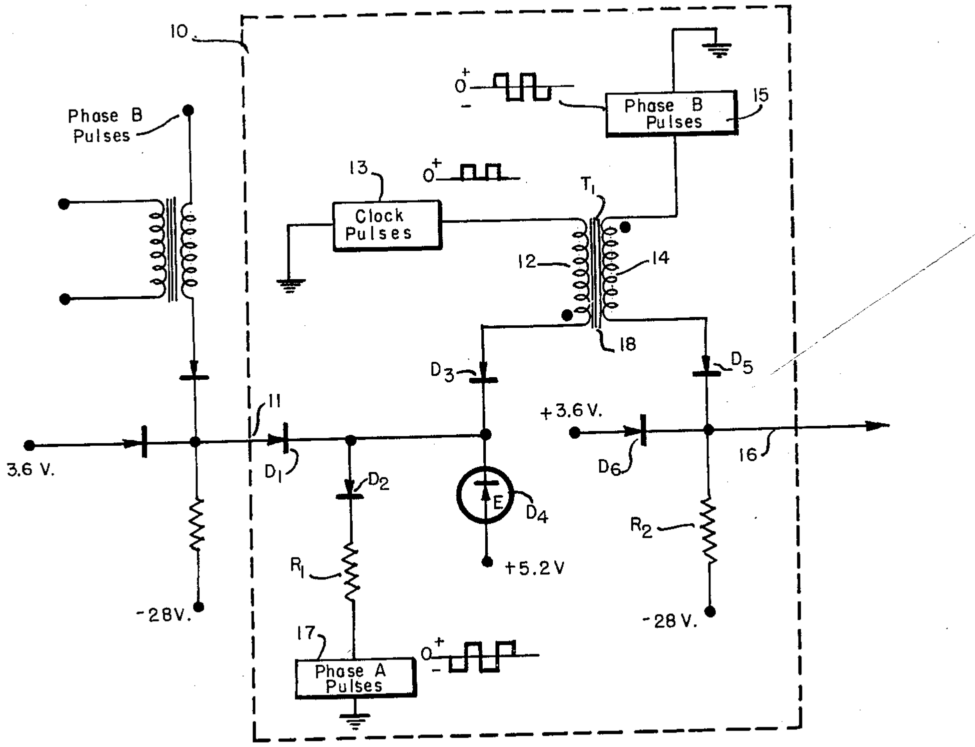

The present invention relates to control circuits for use in pulse type systems; and is more particularly concerned with a chain of such control circuits capable of acting as a shifting register. In one aspect of the invention, the control circuits to be described may be arranged to exhibit bistable operation; and it is to be understood that such a bistable arrangement is also meant to form a portion of the present invention.

Various forms of bistable devices and shifting registers have been suggested in the past, and such circuits find utility in various control applications, such as those employed in digital computation devices. The present invention relates to circuits of this general type utilizing the enhancement properties of solid state diodes or semiconductor devices for providing selective storage in a control device, thereby to permit more rapid operation and greater reliability of operation through the use of simpler circuitry than has been the case in the past.

It is accordingly an object of the present invention to provide an improved bistable device.

A further object of the present invention resides in the provision of a control circuit effectively utilizing the "enhancement properties" of semiconductor devices in the operation thereof.

Another object of the present invention resides in the provision of an improved amplifier device utilizing a semiconductor rectifier.

A still further object of the present invention resides in the provision of an amplifier device which is more rugged in configuration and less subject to operating failures than has been the case heretofore.

Still another object of the present invention resides in the provision of amplifier devices, bistable devices, and registers having better operational characteristics than has been the case heretofore.

A still further object of the present invention resides in the provision of amplifier devices, bistable devices, and registers which may be made in relatively small sizes.

A still further object of the present invention resides in the provision of a shifting register utilizing plural amplifier stages employing semiconductor rectifiers wherein the said semiconductor rectifiers may be utilized as delay elements to provide intermediate storage between the said stages.

In providing for the foregoing objects and advantages, the present invention, as mentioned above, effectively utilizes the enhancement properties of semiconductor rectifiers in the provision of a storage element for use in a control circuit, a bistable device or a shifting register. In this respect, it should be noted that, in general, a semiconductor device may be defined as one presenting a relatively low impedance to current flow in a forward direction and presenting a relatively high impedance to current flow in an opposing or back direction. In practice, it has been found, however, that when a semiconductor device, such as a germanium or silicon diode, has a forward current flowing therethrough, this forward current will tend to effect a storage of excess holes or electrons in the lattice structure of the solid state material utilized; whereupon, if the said semiconductor device should then be suddenly subjected to an inverse voltage, a relatively large reverse transient current initially flows which may in fact exceed the forward current in magnitude. This transient current results from the applied inverse voltage sweeping out unrecombined injected carriers from the semiconductor device, and the reverse transient current so effected is termed "enhancement current." This enhancement phenomenon is exhibited in some degree by all semiconductors utilizing material into which minority carriers can be injected, such as germanium and silicon.

It will be appreciated from the foregoing discussion that, due to the enhancement properties exhibited by semiconductor rectifiers or other semiconductor devices, such a device may be utilized in a control circuit by selectively causing a forward current to flow therethrough, whereby the device becomes a conductor to a reverse current flow; or, in the alternative, by failing to provide a forward current flow through the said device, whereby the said device acts to block subsequent reverse current flow therethrough. Various forms of amplifiers and compatible amplifiers employing this property of semiconductor devices have been suggested in the past, and in particular, attention is invited to the Patent Number 2,825,820 of John C. Sims, Jr., Serial No. 505,707, issued March 4, 1958, for: "Enhancement Amplifier." The aforementioned Sims patent discusses various circuits employing semiconductor devices for control purposes, and in one form of his invention, Sims discusses the provision of a shifting register utilizing such a control circuit.

In the particular form of register disclosed by Sims, the aforementioned forward current flow for enhancing the semiconductor device, is achieved by an input signal; and while the device suggested by Sims operates quite satisfactorily, this requirement that the input signal effect forward current flow through the semiconductor device often places undesired minimum requirements upon the capacity of a signal pulse source. In accordance with the present invention, this undesired characteristic may be eliminated by the use of an auxiliary pulse source which normally serves to regularly enhance a semiconductor device in conjunction with an input circuit adapted to selectively inhibit the enhancement of the said semiconductor device.

In providing a control circuit of the type suggested above, the present invention utilizes a transformer having a pair of windings inductively coupled to one another, and having a source of energization pulses coupled to one of the said windings and a source of clock pulses coupled to the other of the said windings. The said source of clock pulses tends to regularly revert the said transformer (or magnetic amplifier) to a hysteretic operating point such that the source of energization pulses is incapable of producing an output. In so reverting the said transformer or magnetic amplifier, the source of clock pulses includes in its current path a semiconductor rectifier such that, in order for clock pulses to effect reverting current flow through its associated transformer or amplifier winding, the said semiconductor rectifier must previously have been enhanced.

This enhancement condition of the semiconductor rectifier is effected by a further source of energization pulses coupled to the semiconductor rectifier so that, in normal practice, the semiconductor rectifier is regularly enhanced, the clock pulses regularly effect reverting current flow through the associated winding of the transformer or amplifier, and the transformer or amplifier accordingly produces no signal. An input signal serves to inhibit the enhancement of the semiconductor rectifier whereby the source of clock pulses is incapable of reverting the transformer or amplifier, and the said transformer or amplifier thereafter produces an output.

Figure 2:
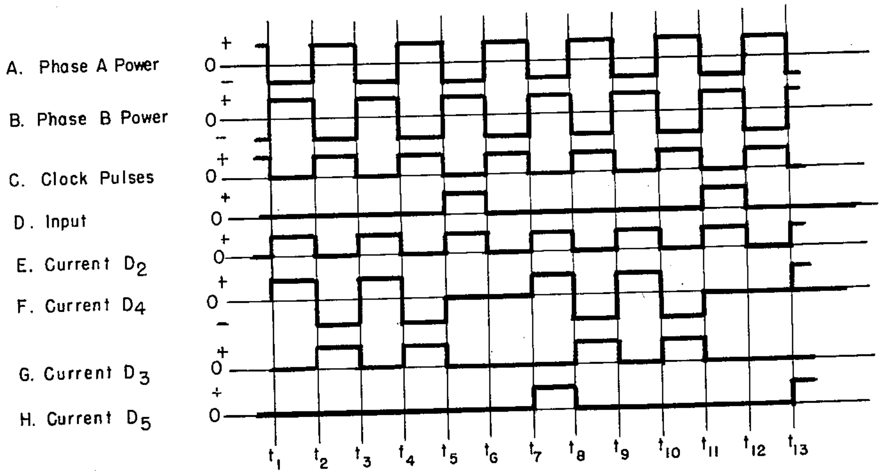
Figure 1A:
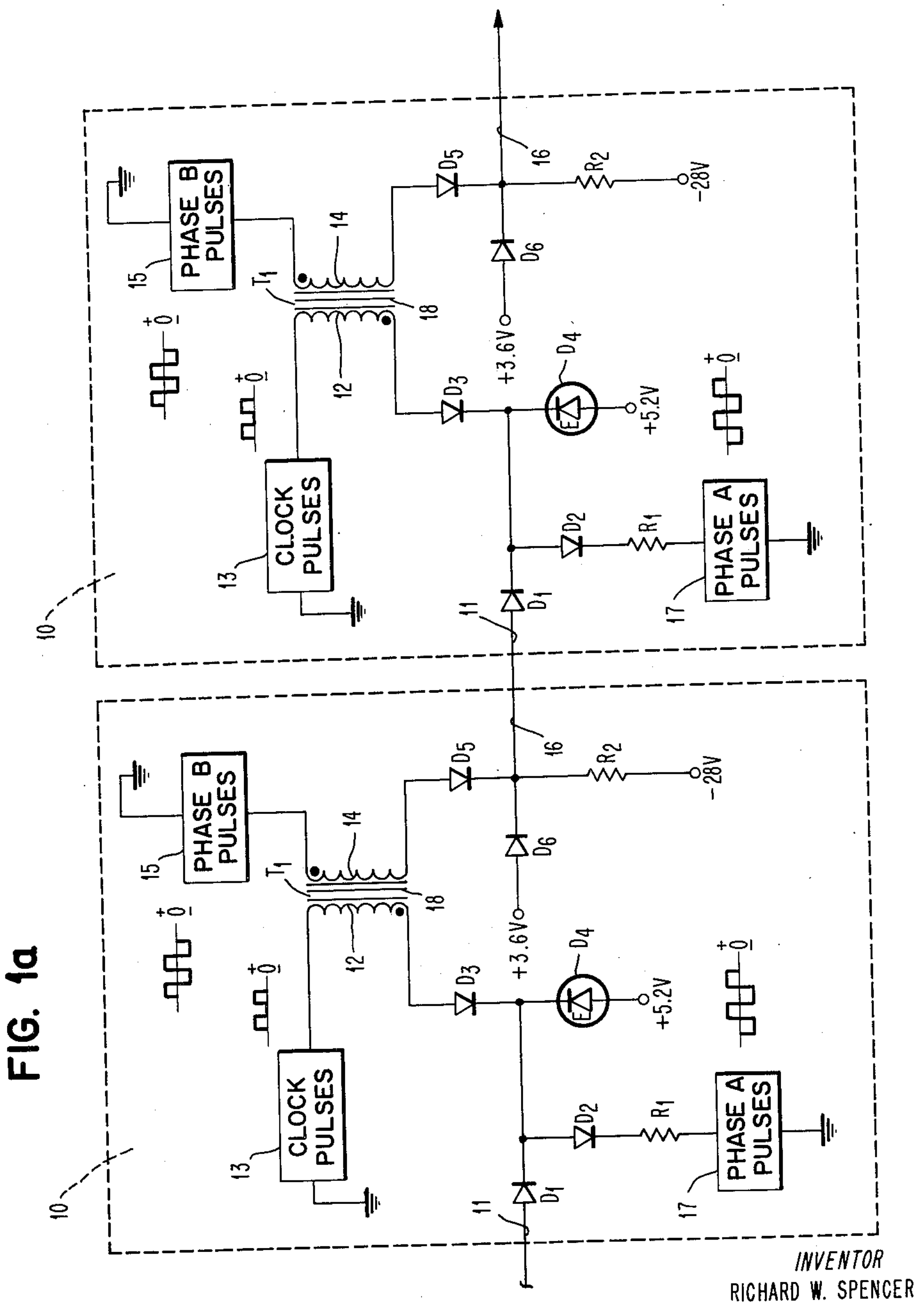
Figure 3:
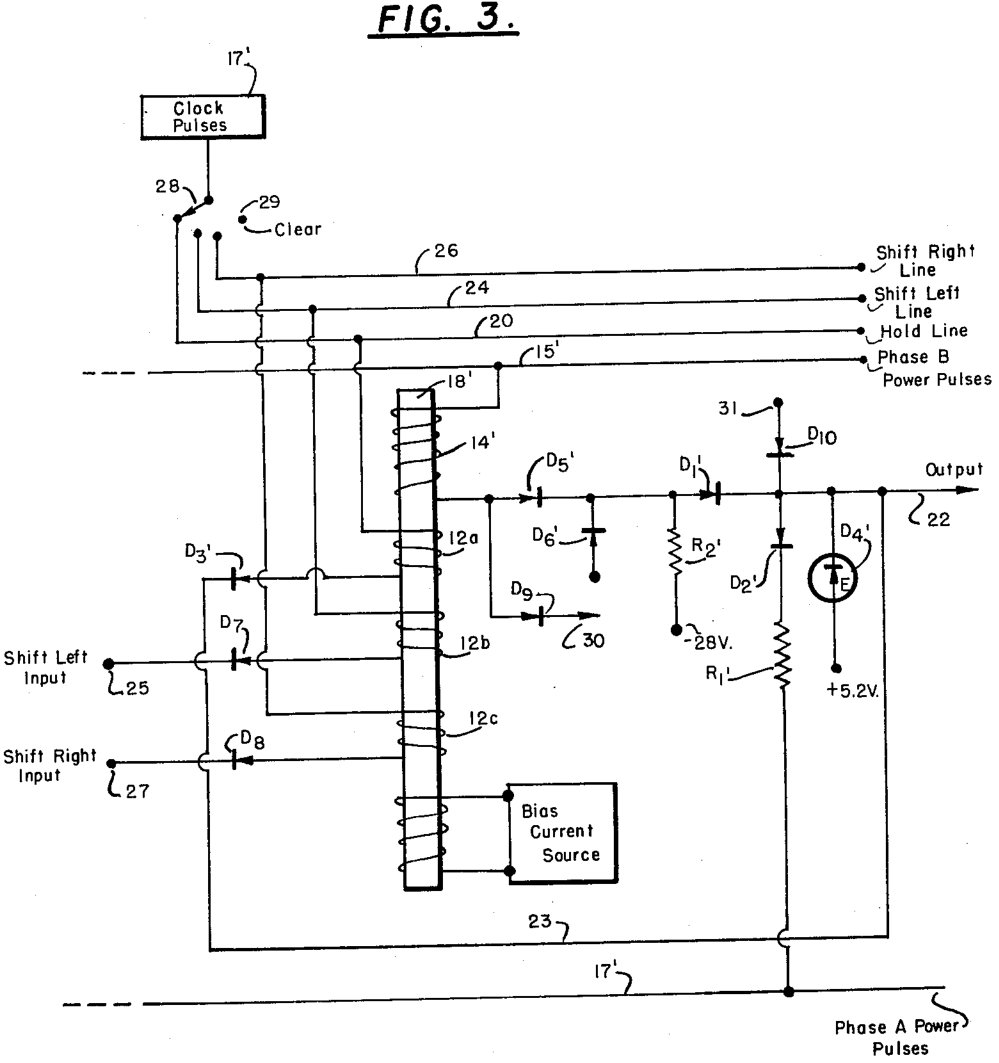

The foregoing objects, advantages, construction and operation of the present invention will become more readily apparent from the following description and accompanying drawings, in which:

FIGURE 1 is a schematic diagram of one form of control circuit constructed in accordance with the present invention;

FIGURE 1*a* is a schematic diagram of one form of a shifting register comprising a plurality of control circuits as shown in FIGURE 1 which are constructed in accordance with the present invention;

FIGURE 2 (A through H) are waveform diagrams illustrating typical operation of the circuit shown in FIGURE 1; and FIGURE 3 is a modified circuit generally of the type shown in FIGURE 1, which is particularly adapted for use in a shifting register capable of holding information or shifting it either to the right or left.

Referring now to FIGURES 1 and 1*a*, it will be seen that a control circuit 10 (shown in the dotted box) may be utilized as an independent amplifier stage or as one stage of a shifting register. In view of the similarity of material, similar reference numerals refer to similar components. In addition, the operation of each stage of the shifting register of FIGURE 1*a* is similar to the operation as described in conjunction with the circuit shown in FIGURE 1. When employed in either of these manners, input pulses may selectively appear at a point 11, and may be coupled via rectifier D1 to a common junction of further rectifiers D2, D3 and D4. Rectifier D2 is coupled via a resistance R1 to a source 17 of regularly occurring power pulses having a phase A (see FIGURE 2A). Rectifier D3 is coupled to one end of a winding 12 in a transformer or magnetic amplifier T1, and the other end of the said winding 12 is coupled to a source of regularly occurring clock pulses 13 (FIGURE 2C). The transformer or amplifier T1 has a further winding 14 thereon, and one end of the said further winding is coupled to a source 15 of power pulses having a phase B (FIGURE 2B); while the other end of the said winding 14 is coupled via a rectifier D5 to an output point 16 which is selectively clamped at a predetermined potential, for instance +3.6 volts, by an arrangement comprising clamp rectifier D6 and resistor R2, coupled to potential sources of +3.6 volts and —28 volts, as shown.

Also coupled to the common junction of rectifiers D1, D2 and D3 is a further rectifier D4, and this further rectifier comprises a semiconductor device such as a germanium or silicon diode, which exhibits a relatively large enhancement current capacity. It will be appreciated from an examination of FIGURE 1 that the rectifiers D2 and D4 are effectively in series with one another; and that the series connection comprising rectifiers D2 and D4 is such that the said rectifiers D2 and D4 are poled in the same direction with respect to one another. Phase A power pulses supplied by source 17 of a preselected polarity are therefore selectively effective in producing current flow through the series circuit comprising rectifiers D4 and D2, whereby current regularly tends to flow in a forward direction through rectifier D4 thereby to enhance the said rectifier. It will further be appreciated from an examination of FIGURE 1, that rectifiers D3 and D4 are also effectively in series with one another; but that this series connection is such that the said rectifiers D3 and D4 are oppositely poled with respect to one another. Current may therefore flow from the clock pulse source 13 via winding 12, via rectifier D3, and through the rectifier D4 in a reverse direction, only when the said rectifier D4 has been previously enhanced.

The phase A pulses supplied by source 17 exhibit regularly occurring positive and negative polarity excursions, and the phase B pulses supplied by source 15 exhibit positive and negative-going excursions of polarity, with a positive excursion of one of the said sources being coincident with the negative excursion of the other of the said sources. The clock pulses supplied by source 13 preferably exhibit regularly occurring positive-going excursions, and these excursions coincide with positive-going excursions of the phase A power pulse source (compare FIGURES 2A, 2B and 2C).

In operation, it will be seen that when the phase A power pulse source 17 goes negative, current may flow from the +5.2 volt potential indicated in FIGURE 1, via rectifier D4 in a forward direction, and thence via rectifier D2 and resistor R1, thereby to enhance the rectifier D4. During such current flow, the anode of rectifier D2, and therefore the cathode of rectifier D1, will be at substantially the anode potential of rectifier D4, namely +5.2 volts; and if the anode of rectifier D1 is at a lower potential, for example +3.6 volts, then the said rectifier D1 will not conduct and the phase A power pulse current will only flow through rectifiers D4 and D2. Due to the enhancement of rectifier D4, a next subsequent clock pulse supplied by source 13 is capable of effecting current flow via winding 12 and via rectifiers D3 and D4 (current flow through D4 being in a reverse direction), thereby to revert the core of transformer or amplifier T1 to a negative remanence hysteretic operation point, if the said transformer or amplifier core had originally been at a positive remanence point. This operation of the transformer or amplifier core will cause the winding 14 to exhibit a relatively high impedance to a next subsequently occurring phase B pulse supplied by source 15 whereby no output may appear at the terminal 16.

This operation will continue and no outputs will appear at terminal 16 so long as the semiconductor rectifier D4 is regularly enhanced by current flow effected by the phase A power pulse source 17. If, however, an input pulse should appear at point 11, during a negative-going excursion of the phase A power pulse supplied by source 17, the rectifier D1 will be rendered conductive, current will flow as before, through rectifier D2 and resistor R1, but this current will now flow through rectifier D1 rather than through semiconductor rectifier D4. The application of an input pulse at point 11 therefore inhibits forward current flow through the rectifier D4 whereby the said rectifier D4 is not enhanced, and a next subsequent clock pulse supplied by source 13 will be incapable of effecting current flow through winding 12, whereby the transformer or amplifier T1 is not reverted, and winding 14 presents a low impedance to a phase B power pulse which then effects an output signal at point 16.

The overall operation, therefore, is such that in the absence of input pulses at point 11, no output pulses appear at point 16; while in response to the application of an input pulse at point 11, an output pulse appears at point 16. When utilized as one stage of a shifting register, therefore, the circuit shown in block 10 is capable of receiving a pulse at point 11 from a preceding stage; and of thereafter shifting this pulse to a succeeding stage coupled to the point 16.

The foregoing operation will become more readily apparent from a consideration of the waveforms shown in FIGURE 2. Let us initially assume that the core 18 in transformer or amplifier T1 is at its negative remanence operating point. During a time interval *t1* to *t2*, a negative-going phase A power pulse occurs from the source 17 (FIGURE 2A), while a positive-going phase B power pulse occurs from the source 15. Due to operation of the core 18 at its negative remanence operating point, the winding 14 will present relatively high impedance to the positive-going phase B power pulse whereby little if any output appears at the terminal 16 during the said time interval *t1* to *t2*, and during this time interval the phase B power pulse merely flips the core 18 from its minus remanence operating point to its plus remanence operating point. In this respect it should be noted that the said core 18 preferably comprises a magnetic material exhibiting a substantially rectangular hysteresis loop.

During this same time interval *t1* to *t2*, the negative-going phase A power pulse effects a current flow from the +5.2 volt source via rectifier D4 in a forward direction, and thence via rectifier D2 and resistor R1, and this forward current flow through rectifier D4 enhances the said rectifier D4. During a next subsequent time interval $t2$ to $t3$, the phase A power pulse supplied by source 17 goes positive, whereby the rectifier D2 is cut off. During this same time interval $t2$ to $t3$, a positive-going clock pulse is effected by source 13 (see FIGURE 2C), and this clock pulse passes current via winding 12 and rectifier D3 and thence via enhanced rectifier D4 in a reverse direction thereby to flip the core 18 from its plus remanence point to its minus remanence point. During a next time interval $t3$ to $t4$, therefore, the winding 14 again exhibits a relatively high impedance whereby the positive-going phase B power pulse occurring during this time interval $t3$ to $t4$ is again incapable of producing an output at terminal 16.

To summarize the foregoing operation, therefore, it will be seen that in the absence of input pulses at point 11, the semiconductor rectifier D4 is regularly enhanced by the phase A power pulse source 17 causing forward current flow therethrough, whereupon the clock pulse source 13 may regularly revert the core 18 to its negative remanence operating point; and the phase B power pulses produce no output at the terminal 16. Under these operating circumstances, the output point 16 is maintained at a predetermined reference potential, for instance +3.6 volts, by the clamp circuit comprising rectifier D6 and resistor R2; and due to the symmetry of the circuit, it will be appreciated that the input point 11 is similarly maintained at the said reference potential provided no output occurs from a preceding control stage, whereby the said rectifier D1 remains disconnected.

If, now, during a time interval, for instance $t5$ to $t6$, an input pulse should appear at the terminal 11, the rectifier D1 will be rendered conductive. During this time interval $t5$ to $t6$ the phase A power pulse is again negative in polarity, and current flow once more passes via rectifier D2 and resistor R1. Due to the conductivity of rectifier D1, however, this current flow now passes through rectifier D1 rather than through rectifier D4. Rectifier D4 is therefore not enhanced during the time interval $t5$ to $t6$, and during a next subsequent time interval $t6$ to $t7$, when the clock pulse supplied by source 13 goes positive, current flow will be incapable of passing in a reverse direction through the semiconductor rectifier D4.

It should be noted in this respect that during the time interval $t6$ to $t7$, the phase A power pulse is positive thereby maintaining rectifier D2 in a non-conductive state, and the rectifier D1 is similarly non-conductive whereby no current path is provided for current flow through the winding 12. The core 18, since it is not reverted by a clock pulse effecting current flow through winding 12, therefore remains at its plus remanence operating point, and during a next subsequent time interval $t7$ to $t8$ the winding 14 presents a relatively low impedance to the positive-going phase B power pulse supplied by source 15, and the said core 18 is driven into positive saturation. The phase B power pulse, occurring during time interval $t7$ to $t8$, therefore effects current flow through rectifier D5 to output point 16; and it should be noted that this current flow through the rectifier D5 is sufficient to raise the potential of output point 16 to a value greater than +5.2 volts, thereby to prevent enhancement of the semiconductor diode in the next subsequent stage of the register.

Again, summarizing the foregoing operation, it will be seen that occurrence of an input pulse at terminal 11 renders rectifier D1 conductive, whereby the phase A pulse supplied by source 17 now effects current flow via rectifier D1 rather than via rectifier D4, and the said rectifier D4 is not enhanced. This lack of enhancement in the rectifier D4 breaks the current path for reverting pulses supplied by clock source 13 through winding 12 whereby the transformer or amplifier T1 is not reverted to a minus remanence operating point; and the output winding 14 remains in a low impedance state thereby to permit a phase B power pulse supplied by source 15 to produce an output at terminal 16. Thus, input pulses appearing at terminal 11 serve to inhibit the enhancement of semiconductor rectifier D4 and this enhancement inhibition of the said rectifier D4 in turn causes an output to appear at the terminal 16 whereby the input pulse is shifted to the next subsequent stage of the register.

It will be appreciated that the control circuit stage thus described in reference to FIGURE 1 acts essentially as a non-complementing amplifier; and it will further be appreciated that, by coupling the output point 16 back to the input point 11, the circuit shown in FIGURE 1 may exhibit bistable operation. Such a bistable operation is in fact contemplated by the present invention. It will further be appreciated that the circuit shown in FIGURE 1 may be employed as one stage of a shifting register (see for example FIGURE 1*a*), and has been described in this manner; and that the shifting register utilizing plurality of stages of the type shown in FIGURE 1 serves to regularly shift pulses, for instance to the right, down the chain of control circuits comprising the register. By modification, moreover, the circuit shown in FIGURE 1 may be employed as a bistable device, or as one stage of a shifting register which is capable of selectively holding information or of selectively shifting that information either to the right or to the left of the stage; and one such modified circuit is shown in FIGURE 3.

The circuit illustrated in FIGURE 3 is essentially the same as that already described in reference to FIGURE 1, and corresponding components in the two figures have been identified by like numerals with the components of FIGURE 3 being given a primed notation to indicate their correspondence with like components in FIGURE 1. Rather than providing a single input winding 12 of the type shown in FIGURE 1, however, the core 18′ carries a plurality of input windings, identified respectively as 12*a*, 12*b* and 12*c*. One end of input winding 12*a* is coupled to a hold line 20, and the other end of the said input 12*a* is coupled via rectifier D3′ to output terminal 22. One end of input winding 12*b* is coupled to a shift-left line 24, and the other end of the winding 12*b* is coupled via rectifier D7 to a shift-left input terminal 25. One end of input winding 12*c* is coupled to a shift-right line 26, and the other end of the said winding 12*c* is coupled via a rectifier D8 to a shift-right input terminal 27. The several lines 20, 24 and 26 are selectively coupled to a source of clock pulses 17′, through the medium of a rotary switch 28, and the said switch may in fact be electronic in nature. The switch 28 also has a position 29 wherein the said clock pulse source 17′ is not coupled to any of the lines 20, 24 or 26.

The upper end of winding 14′ is, as before, coupled to a source of phase B power pulses appearing on a common line 15′; and the lower end of resistor R1′ is coupled to a further source of phase A power pulses, again indicated as 17′. The terminals 25, 27 and 22 have been designated in the manner shown in FIGURE 3 merely to illustrate their interconnection in an overall register chain; and the shift-left input terminal 25, for instance, is coupled to the output terminal of a following amplifier stage. Similarly, the shift-right input terminal 27 is coupled to the output terminal of a preceding stage.

In operation, it will be seen that when the switch 28 couples the source 17′ to the hold line 20, outputs appearing at terminal 22 inhibit enhancement of rectifier D4′, and since D4′ is coupled via line 23 to the rectifier D3′, the circuit shown in FIGURE 3 acts as a bistable device when switch 28 is so connected to line 20. The register stage shown in FIGURE 3 will therefore tend to hold its signal state; and if this signal state is such that pulses appear at terminal 22, these pulses will be recirculated in the stage thereby to maintain pulses at the terminal 22. A similar state of operation applies in the other stages of the register.

If, now, the switch 28 should be coupled to the shift-left line 24, the source 17′ will be coupled to the input winding 12*b*. Inasmuch as terminal 25 is connected to the output terminal of a following stage, output pulses (if any) of such a following stage will flow in input winding 12*b* whereby output pulses will appear in the stage of FIGURE 3. If the said following stage is in a non-output producing state, the stage shown in FIGURE 3 will similarly assume a non-output producing state. Thus, when the source 17′ is coupled to line 24, the output state of each stage in the register will be shifted to a preceding stage in the register, i.e. a "shift-left" will occur.

By analogy, it will be seen that when switch 28 is moved to couple clock source 17′ to the shift-right line 26, the input winding 12*c* will be effectively connected, via terminal 27, to the enhancement diode and output terminal of a preceding register stage. The output state of such a preceding stage will accordingly be shifted to the stage shown in FIGURE 3, i.e. a "shift-right" will occur, and such a shift will occur in each register stage.

To summarize the foregoing, therefore, it will be seen that an improved register may comprise a plurality of stages each of which includes an output winding, an enhancement rectifier, and several input windings. The output winding of each stage is always coupled to the enhancement rectifier of that stage, while the several input windings may be selectively coupled respectively (*a*) to the enhancement rectifier of its own stage, (*b*) to the enhancement rectifier of a preceding stage, or (*c*) to the enhancement rectifier of a subsequent stage. When connection (*a*) is selected, information is recirculated or held in each stage; when connection (*b*) is selected, information is regularly shifted to the right; and when connection (*c*) is selected, information is regularly shifted to the left.

It will further be noted that, as described, when the clock source 17′ is coupled to the hold line 20, the circuit shown in FIGURE 3 exhibits bistability whereby an input pulse will cause the said circuit to assume a constant pulse recirculation, while lack of an input pulse will cause the device to maintain a non-output producing state. If desired, auxiliary outputs may be taken from any one of the stages comprising the shifting register, by means such as rectifier D9, coupled to auxiliary output point 30; and if further desired, auxiliary inputs may be coupled to any one of the stages, for instance by means such as the rectifier D10 coupled to auxiliary input point 31. It will further be noted that when the switch 28 is coupled to terminal 29, no clock pulses are applied to any of the stages comprising the register; and in this state of operation, all the registers will be cleared to zero.

While preferred embodiments of the present invention have been described, many variations will be suggested to those skilled in the art. The foregoing description is therefore meant to be illustrative only and should not be considered limitative of my invention, and all such modifications as are in accord with the principles described, are ment to fall within the scope of the appended claims.

Having thus described my invention, I claim:

1. In a control circuit, a core of magnetic material having an input winding and an output winding thereon, a source of unidirectional pulses coupled to one end of said input winding, a semiconductor rectifier having enhancement characteristics, said rectifier being coupled to the other end of said input winding via a first unilateral conductor, energizing means for effecting forward current flow through said rectifier thereby to enhance said rectifier so that said source of unidirectional pulses may thereafter effect current flow through said input winding and through said rectifier in a reverse direction to cause said core to operate over a first portion of its hysteresis loop, input means for selectively applying signals to bias said rectifier to cut-off thereby inhibiting said energizing means so that said rectifier is not enhanced and said source is incapable of effecting current flow through said input winding whereby said core is caused to operate over a second portion of its hysteresis loop in response to said input means, a first source of regularly occurring power pulses coupled to said output winding, said output winding presenting different impedances to said power pulses in accordance with the portions of said core hysteresis loop being operated over.

2. In a control circuit, first and second rectifiers connected in series, said first rectifier comprising a semiconductor device exhibiting enhancement characteristics, a source of regularly occurring power pulses coupled to one end of said series connected rectifiers, a reference potential source coupled to the other end of said series connected rectifiers so that each pulse from said power pulse source normally effects forward current flow through said series connected rectifiers whereby said first rectifier is enhanced, a utilization circuit coupled to said first rectifier and responsive to reverse current flow through said rectifier, said utilization circuit comprising a core of magnetic material having a control winding thereon, means coupling regularly occurring pulses to one end of said control winding, input means for applying input signals to said first rectifier for selectively inhibiting forward current flow through said first rectifier so that said first rectifier remains unenhanced, and further rectifier means coupling the other end of said control winding to said first rectifier, said further rectifier and said first rectifier being effectively in series with one another and being oppositely poled with respect to one another.

3. In a control circuit, a core of magnetic material having an input winding and an output winding thereon, a source of unidirectional pulses coupled to one end of said input winding, a semiconductor rectifier having enhancement characteristics, said rectifier being coupled to the other end of said input winding via a first unilateral conductor, energizing means for effecting forward current flow through said rectifier thereby to enhance said rectifier so that said source of unidirectional pulses may thereafter effect current flow through said input winding and through said rectifier in a reverse direction to cause said core to operate over a first portion of its hysteresis loop, said energizing means comprising a further source of regularly occurring power pulses coupled to said semiconductor rectifier, input means for selectively applying signals to bias said rectifier to cut-off thereby inhibiting said energizing means so that said rectifier is not enhanced and said source is incapable of effecting current flow through said input winding whereby said core is caused to operate over a second portion of its hysteresis loop in response to said input means, a first source of regularly occurring power pulses coupled to said output winding, said first source of power pulses and said further source of power pulses being respectively of opposite phase, said output winding presenting different impedances to said power pulses in accordance with the portions of said core hysteresis loop being operated over.

4. In a control circuit, a core of magnetic material exhibiting a substantially rectangular hysteresis loop, first and second windings on said core, control means for selectively effecting a unidirectional current flow through said first winding thereby to control the hysteretic operation of said core, said control means including a semiconductor rectifier connected in series with said control winding and poled in a direction opposite to the direction of said unidirectional current flow whereby said current, in flowing through said first winding, must flow in a reverse direction through said rectifier, an energization source isolated from said first winding and coupled to said rectifier for effecting a forward current flow therethrough thereby to control the magnitude of unidirectional current which may thereafter flow in said reverse direction through said semiconductor rectifier, said control circuit including a signal input comprising a source of signals coupled to said energization source for controlling the operation of said energization source thereby to control the magnitude of reverse current which may flow through said rectifier, and output means coupled to said second winding for producing an output signal related to the magnitude of reverse current flow through said semiconductor rectifier.

5. The combination of claim 4 including means coupling the said output means to said signal input whereby the output signal state of said control circuit controls said energization source thereby to control the magnitude of reverse current which may flow in said semiconductor rectifier.

6. The circuit of claim 2 including means coupling said other end of said output winding to said input means whereby said control circuit exhibits bistability.

7. A register comprising plurality of amplifier stages, means coupling the output of each stage of said register to the input of an adjacent stage, each of said stages comprising a transformer having first and second windings, a first source of regularly occurring pulses coupled to one end of said first winding, a second source of regularly occurring pulses coupled to one end of said second winding, a semiconductor rectifier exhibiting enhancement properties coupled to the other end of said first winding, means for producing a forward current periodically flowing through said semiconductor rectifier thereby to enhance said rectifier, said first source of pulses being operative to effect current flow through said first winding and thence in a reverse direction through said semiconductor rectifier when said semiconductor rectifier has been previously enhanced, the output of each stage comprising the other end of said second winding, and the input means of each stage being coupled to one element of said semiconductor rectifier.

8. The register of claim 7 including a third source of regularly occurring pulses coupled to each of said semiconductor rectifiers for regularly enhancing said semiconductor rectifiers, whereby a signal applied to the input means of a given amplifier stage biases said rectifier to cut-off so that said regularly occurring pulses do not flow through said semiconductor rectifier whereby the enhancement of the semiconductor rectifier in said given stage is inhibited.

9. The register of claim 7 including means for selectively coupling the output of each stage to the input of that stage whereby each stage of said register acts to maintain information therein.

10. The register of claim 7 including means for selectively coupling the output of each stage to the input of a next successive stage whereby said register acts to shift signal information from each stage to a next successive stage.

11. The register of claim 7 including means for selectively coupling the output of each stage to the input of a preceding stage whereby said register acts to shift signal information from each stage to a preceding stage.

12. In a control circuit, a core of magnetic material capable of assuming stable remanence conditions and having first and second windings thereon, a first source of regularly occurring pulses coupled to one end of said first winding, a second source of regularly occurring pulses coupled to one end of said second winding, a semiconductor rectifier having enhancement properties being coupled to the other end of said first winding by a first rectifier, said first rectifier and said semiconductor rectifier being oppositely poled to one another, a second rectifier coupling a third source of regularly occurring pulses to said semiconductor rectifier, said second rectifier and said semiconductor rectifier being poled in the same direction to one another so that said third source may cause a current to flow in a forward direction through said rectifiers whereby said semiconductor rectifier may be enhanced, means for selectively applying input signals to the junction of said second rectifier and said semiconductor rectifier so that said semiconductor rectifier is cut-off whereby enhancement thereof is inhibited, said semiconductor rectifier thereby inhibiting reverse current flow through said first winding so that said core is not reset whereby said second winding presents a low impedance to pulses from said second source, and output means for utilizing said signals from said second winding.

13. The circuit of claim 12 wherein said second source of pulses and said third source of pulses have opposite phases with respect to one another.

14. The circuit of claim 13 wherein said means for applying input signals includes a third rectifier coupled between input pulse supplying means and the junction of said second rectifier and said semiconductor rectifier.

15. A shifting register comprising a plurality of control circuits as called for in claim 12, and means coupling the output of each of said control circuits to the input of an adjacent control circuit.

References Cited in the file of this patent

UNITED STATES PATENTS

| | | |
|---|---|---|
| 2,823,321 | Sims | Feb. 1, 1958 |
| 2,877,451 | Williams | Mar. 10, 1959 |

FOREIGN PATENTS

| | | |
|---|---|---|
| 157,186 | Australia | June 23, 1954 |

OTHER REFERENCES

"Transistor Control of Magnetic Amplifiers" (Pittman), Radio-Electronic Engineering, pp. 13–15, February 1954.

"Magnistor-Amplifiers or Storage Elements," Electronic Design, pp. 26–27, April 1955.